(12) United States Patent
Sabins (10) Patent No.: US 6,171,386 B1
(45) Date of Patent: Jan. 9, 2001

(54) CEMENTING COMPOSITIONS, A METHOD OF MAKING THEREFOR, AND A METHOD FOR CEMENTING WELLS

(75) Inventor: Freddie Lynne Sabins, Sugar Land, TX (US)

(73) Assignee: Benchmark Research & Technology Inc., Midland, TX (US)

(*) Notice: Under 35 U.S.C. 154(b), the term of this patent shall be extended for 0 days.

(21) Appl. No.: 09/234,951

(22) Filed: Jan. 21, 1999

Related U.S. Application Data (60) Provisional application No. 60/072,196, filed on Jan. 22, 1998.

(51) Int. Cl.⁷ .......................... C04B 24/24; C04B 24/04; C04B 24/12; C04B 24/16; E21B 33/14
(52) U.S. Cl. .......................... 106/724; 106/725; 106/727; 106/728; 106/802; 106/808; 106/809; 106/810; 106/823; 166/293
(58) Field of Search .................................. 106/823, 724, 106/725, 727, 728, 802, 808, 809, 810; 166/293

(56) References Cited

U.S. PATENT DOCUMENTS

| | | | |
|---|---|---|---|
| 3,411,943 | * 11/1968 | Bragg et al. | 427/403 |
| 3,936,408 | 2/1976 | Adams et al. | 260/29.6 |
| 4,039,345 | 8/1977 | Emig et al. | 106/90 |
| 4,086,201 | 4/1978 | Peters et al. | 260/29.7 |
| 4,151,145 | * 4/1979 | Emig et al. | 524/7 |
| 4,202,809 | * 5/1980 | Eash | 524/2 |
| 4,537,918 | 8/1985 | Parcevaux et al. | 523/130 |
| 4,721,160 | 1/1988 | Parcevaux et al. | 166/293 |
| 4,767,460 | 8/1988 | Parcevaux et al. | 106/90 |
| 5,405,898 | 4/1995 | Sommese | 525/330 |
| 5,629,047 | 5/1997 | Sharma et al. | 427/389 |

OTHER PUBLICATIONS

Walters, D. Gerry, "What Are Latexes?", Concrete International, Dec. 1987, pp. 44–47.

Ohama, Yoshihiko, "Principle of Latex Modification and Some Typical Properties of Latex–Modified Mortars and Concretes", ACI Materials Journal, Nov./Dec. 1987, pp. 511–518.

Lavelle, Joseph A., "Acrylic Latex–Modified Portland Cement", ACI Materials Journal, Jan./Feb. 1988, pp. 41–48.

"Improving Concrete With Polymers", Concrete International, Dec. 1987, pp. 61–66.

Chandra, Satish/Flodin, Per, "Interactions of Polymers and Organic Admixtures on Portland Cement Hydration", Cement and Concrete Research, vol. 17, No. 6, 1987, pp. 875–890 (no month).

Bhattacharya, Vijay K./ Maiti, Mrinal M., "Cement Mortar Impregnated with Poly(Methyl Methacrylate–co–Styrene)", Journal Of Applied Polymer Science, vol. 34, 1987, pp. 1645–1655 (no month).

Bradley, Geoffrey/Howarth, Ian M., "Water Soluble Polymers: The Relationship Between Structure, Dispersing Action, and Rate of Cement Hydration", Cement, Concrete, and Aggregates, 1986, pp. 68–75 (no month).

* cited by examiner

*Primary Examiner*—Anthony Green
(74) *Attorney, Agent, or Firm*—Christopher L. Makay (57) ABSTRACT

A cement composition includes cement, water in an amount from about 30% to 200% by weight of cement, and an interpolymer latex in an amount from about 10% to 50% by weight of cement. The interpolymer latex includes at least one conjugated diene monomer having 4 to 8 carbon atoms in an amount from about 5% to 95% by weight of the interpolymer latex, at least one vinyl aromatic monomer having 8 to 12 carbon atoms in an amount from about 5% to 95% by weight of the interpolymer latex, and a copolymerizable functional monomer in an amount from about 0.5% to 50% by weight of the interpolymer latex. A method of making a cement composition involves placing the above ingredients in a suitable mixer well known to those of ordinary skill in the art and mixing the ingredients until they form the cement composition. A method for cementing a subterranean zone penetrated by a wellbore involves forming a cement composition according to the above method, pumping the cement composition into the subterranean zone to be cemented by way of the wellbore, and allowing the cement composition to set within the subterranean zone.

45 Claims, 2 Drawing Sheets

CEMENTING COMPOSITIONS, A METHOD OF MAKING THEREFOR, AND A METHOD FOR CEMENTING WELLS

This application claims priority from U.S. Provisional Application Ser. No. 60/072,196 filed on Jan. 22, 1998.

BACKGROUND OF THE INVENTION

1. Field of the Invention

The present invention relates to additives, cementing compositions and methods of use and, more particularly, but not by way of limitation, to additives, cementing compositions and methods for use in oil, gas, and geothermal wells.

2. Description of the Related Art

In downhole cementing operations, such as those that occur in oil, gas, and geothermal wells, it is known to use cementing compositions that contain, among other ingredients, a hydraulic cement and a latex (or lattice). A latex is a dispersion of organic polymer particles in water. Most latexes are milky white to off-white in color and vary in consistency or viscosity from low viscosity, water-thin fluids to very viscous liquids. The basic components of a latex are a polymer composition, surfactants and, in many cases, compounding ingredients.

The polymer composition, molecular weight, and particle sizes of the organic polymer in the dispersion have a significant effect on the properties of the liquid cement slurry as well as the hardened or cured cement. Because most latexes are made through a process of emulsion polymerization, with the exception of epoxy resin latexes, surfactants are present and a key ingredient in the latex. Most latexes contain a nonionic surfactant and an anionic surfactant. The nonionic surfactant is typically, but not limited to, a nonylphenol with 10 to 40 moles of ethoxylation and is the primary emulsifier. The concentration of nonionic surfactant typically ranges from 1 to 10 percent by total weight of the latex dispersion. Anionic surfactants are used at much lower concentrations, typically between 0.1 and 2 percent. Anionic surfactants function to control the rate of polymerization of the monomers being reacted to form the latex polymer.

Compounding ingredients are added after polymerization is complete to improve the latex product for the application. Compounding ingredients include bactericides, defoamers, antioxidizing agents, ultraviolet light (UV) stabilizers, and additional surfactants to improve workability of a cement formulation, improve freeze-thaw stability, reduce water-to-cement ratio, etc. Many surfactants added to improve workability (viscosity or consistency of the liquid cement slurry) or reduce the water-to-cement ratio function as dispersants for the cement particles.

The majority of latex types that have been or are being used with hydraulic cements, such as Portland cement, are: polyvinyl acetate, acrylic copolymers, styrene acrylic copolymers, vinyl acetate acrylic copolymers, vinyl acetate ethylene copolymers, vinylidene chloride and vinyl chloride copolymers, styrene butadiene copolymers (SB), and epoxy resin latexes. Each type of latex imparts different properties when used as an additive or polymeric modifier to hydraulic cement mixtures.

One of the most common latexes used in oil, gas and geothermal cement formulations is styrene butadiene (SB) latex. The most widely practiced application of styrene butadiene latexes is for prevention or control of gas migration or channeling after cementing based upon the art described in U.S. Pat. Nos. 4,537,918, 4,721,160 and 4,767,460 by Parcevaux et al. The art described by Parcevaux et al. in these patents is essentially a combination of the art described in U.S. Pat. Nos. 3,228,907, 4,151,150, and 4,039,345. Gas migration occurs when the well traverses a pocket of compressed gas and after a cement slurry has been injected into the well (either into the annular space between the casing and the borehole wall or interiorly of the casing). Gas migration or channeling occurs during the setting of the cement; from the time when setting of the cement has progressed such that the hydrostatic pressure of the cement column is no longer transmitted to the pocket of compressed gas but prior to the slurry sufficiently setting to oppose the migration of the gas into the setting cement under the pressure from the compressed gas pocket. The migrating gas permeates the cement during the course of its setting, creating a multiplicity of channels that may reach up to the surface of the well. Gas channeling can be a serious drawback, leading to weakening of the cement and to safety problems on the surface. In addition to preventing gas channeling or migration, SB latexes serve to increase adhesion of the cement to the casing and the formation, reduce fluid loss, and increase the elasticity and flexural strength of the set cement.

The key learning from the related art regarding the application of styrene butadiene latexes can be described as follows. First, the latexes are copolymers of styrene and butadiene having a styrene to butadiene weight ratio of about 30:70 to 70:30. This range is preferred because of the mechanism of action of latex for improved bonding and control of gas migration requires a latex that effectively forms films around the cement particles and coalesces when contacted by gas. Copolymer latexes with styrene content greater than about 70 percent do not form films that will provide the required mechanism of action. Copolymer latexes with a butadiene content greater than about 70 percent are so inherently unstable that, although they form effective films, they are for all practical purposes impossible to stabilize (control coagulation of the latex) in the presence of divalent ions present in cement slurries and at elevated temperatures. Essentially, SB latexes in cement compositions aimed at curtailing gas migration or channeling are generally limited to use at low temperatures (e.g., less than 200° F.) or require stabilizers. Furthermore, without stabilizers, particularly at high pH levels, SB latexes tend to flocculate.

Second, the mechanism of improved cement bonding is through the interaction of the latex coating of the cement particles with (a) the geologic formation of the borehole wall or drilling fluid filter cake deposited on the borehole wall and (b) with the surface of the steel, fiberglass or other material of construction for the well casing. Styrene butadiene copolymer latexes provide a natural adhesion to solids because of their film forming tendencies. Further, the coating of the particles and films formed between cement grains and casing or borehole wall surfaces effectively increase the contact surface area of the cement slurry. Since shear bond strength of cement is a direct function of surface area, effectively increasing the surface area directly increases the shear bond strength between the cement and surrounding surfaces.

Third, styrene butadiene copolymer latexes are inherently unstable in cement slurries and particularly at the elevated temperatures typically associated with well cementing. Temperature, the shear of mixing and pumping the cement slurry, the concentration of electrolytes, such as chloride salts of alkali earth metals (sodium chloride, potassium chloride and calcium chloride by example) and formation fluids such as brines, carbon dioxide, hydrogen sulfide, natural gas and oil all affect the stability of the latex during and after placement of the cement slurry. The fundamental cause of this instability is the stability of the latex emulsion itself. The type and quantity of surfactants used in the manufacture of the latex are selected for the stability of the emulsion of the two monomers (styrene and butadiene) in the polymerization process to form the latex copolymer. Additional surfactants of same or different types used in the preparation of the latex are added to stabilize the emulsion for its intended use. This is well known to those practiced in the art of coatings and application of latex modified cement coatings for construction industry applications. An example of this is in U.S. Pat. No. 4,039,345. Parcevaux et al (U.S. Pat. No. 4,767,460) simply selected suitable surfactants compatible with the electrolytes present in cement slurries and which were effective to stabilize the copolymer emulsion at elevated temperatures.

Fourth, the fundamental instability of styrene butadiene copolymer latexes is necessary to provide film forming necessary to control gas migration through a cement slurry. When gas invades the cement, it naturally attempts to flow through the permeability of the slurry. Parcevaux et al (U.S. Pat. No. 4,537,918) described a 'selective' film-forming response to gas by the latex to immediately inhibit further channeling or movement of the gas through the cement slurry.

Although not well understood or defined at the time by Parcevaux and others skilled in the art of well cementing, the selective film-forming response to gas by the styrene butadiene copolymer latex is a two-step process. Initiation of the process of gas invasion into the cement is the entry of small gas bubbles into the cement slurry. The gas bubbles must be small enough to enter the natural pores of the cement slurry. Migration of the small bubbles is limited because the force required to control movement of the bubbles, according to Stoke's Law, is small due to the small radius of the bubble. The gel strength of the slurry, the strength of the latex films between cement particles and/or the effective hydrostatic provided by the cement slurry or other fluid column above the cement in the annulus is sufficient to prevent movement of these small bubbles through the matrix porosity and permeability of the cement. As more small bubbles invade, some of the small bubbles combine to form larger bubbles. According to Stoke's Law, the force required to prevent migration of the gas bubble increases directly as a cubic function of the bubble radius. This process of combination of gas bubbles increases until the bubble is large enough to begin moving through the cement slurry, not just through the normal pore spaces within the cement. Large bubbles have sufficient force to overcome the gel strength or electrostatic attraction between cement particles in the slurry and thus force the cement grains apart to form a gas channel in the cement.

The selective film forming process described by Parcevaux is effective at all stages of gas invasion but is particularly more effective prior to the formation of a gas channel. At the time small bubbles begin to combine and move through the cement, the latex films between cement grains act as a barrier to movement of the bubbles, The self-adhesive properties of the latex film provide additional resistance to flow of the gas through the cement slurry above the gel strength force between cement grains. In fact, the latex film coating the cement particles tends to prevent the natural gel strength or electrostatic attraction between the surface of the cement grains. This accounts for the improved rheological properties (low gel strengths) observed by Parcevaux. As the gas bubble begins to move, the film of latex between the cement grains is expanded. If the force exerted by the bubble is sufficiently high, the latex film may be ruptured. Herein lies the first part of the selective film forming response of the latex as referred to by Parcevaux. When the stable latex film ruptures, it typically ruptures in multiple points. This effectively divides the large gas bubble into smaller bubbles that often exert a force below the rupture strength of the latex films. This process can be repeated until a large bubble has been subdivided into sufficiently small bubbles to become immobilized. The second part of Parcevaux's selective film forming response occurs during the process of the rupture of the latex film. As the gas bubble attempts to force its way through the latex film, the gas acts to dehydrate or dry the latex. The result is a coalescence and coagulation of some of the latex in the film. The coagulated latex precipitates from the film forming a viscous elastomeric mass that plugs part of the pore space of the cement slurry yet remains compatible with the uncoagulated latex. As a result, the coagulated latex becomes another solid across which new films may be formed by the remaining latex. This part of the selective film forming response is directly related to the concentrations of latex required to effectively control gas migration cited by Parcevaux. Sufficient latex must be present to allow some coagulation as well as maintain a volume of uncoagulated latex to re-form films between solids in the slurry. The action of dehydrating, coalescing and coagulating latexes is well know to those skilled in the art of latex paints, paper and textile coatings.

Fifth, styrene butadiene copolymer latexes reduce the fluid loss of cement slurries through a mechanism of film forming between cement grains. Stability of the films is critical to maintaining fluid loss control. Coagulation of the latex eliminates the films and unless sufficient additional latex is present which is uncoagulated, the fluid loss of the slurry increases dramatically.

Sixth, the improved rheological properties imparted by styrene butadiene copolymer latexes are also a function of the films coating the cement grains. This limits the development of gel strength or magnitude of electrostatic forces between cement grains. Additionally, the anionic surfactants present in the latex are also dispersants for cement particles and tend to neutralize some of the surface charges on the cement grains.

Finally, styrene butadiene copolymer latexes generally require a stabilizer for application in well cementing formulations to control or prevent coagulation of the latex. Stabilizers are especially required at elevated temperature (generally over 100 (F) and in the presence of salts, gas, oil and high surface area solids such as clays (bentonite attapulgite and sepiolite by example). Surfactants, sequestering agents and some low molecular weight resins can stabilize latexes. Low molecular weight resins that are stabilizers for styrene butadiene copolymer latexes cited in prior art include anionic polyelectrolytes such as sulfonated, sulfated, or sulfited melamine-formaldehyde, naphthalene-formaldehyde or phenol formaldehyde resins with molecular weights between about 200 and 10,000. Also, polyamidosulfonic polymers having molecular weights in the same range.

Because cement dispersants and retarders generally fall within the chemical classification of surfactants, sequestering agents and low molecular weight resins optimum stabilization of a styrene butadiene copolymer latex is extremely complex. Latex stabilization is so complex that changes in the basic cement chemistry may impact stabilization properties of the latex. As those skilled in the art of well cementing know, cements vary significantly between manufacturer and between each mill run batch for a given manufacturer and cement plant. This is due to variations in raw materials, raw material blends, heating time and heat distribution within the cement kiln. Therefore, the stability of a latex can vary significantly even when other components of the formulation remain the same. Controlling the selective film forming response of the latex for well conditions is difficult and overstabilization of the latex produces stable films that do not effectively coalesce and coagulate when contacted by gas. This accounts for the lack of complete success of styrene butadiene copolymer latexes for controlling gas migration within the industry after nearly twenty years of use.

Accordingly, there is a need for cement compositions containing an SB latex that exhibit stability at high temperatures (i.e., above about 200° F.), do not require stabilizers, and are effective at preventing gas migration or channeling.

SUMMARY OF THE INVENTION

In accordance with the present invention, a cement composition includes cement, water in an amount from about 30% to 200% by weight of cement, and an interpolymer latex in an amount from about 10% to 50% by weight of cement. The interpolymer latex includes at least one conjugated diene monomer having 4 to 8 carbon atoms in an amount from about 5% to 95% by weight of the interpolymer latex, at least one vinyl aromatic monomer having 8 to 12 carbon atoms in an amount from about 5% to 95% by weight of the interpolymer latex, and a copolymerizable functional monomer in an amount from about 0.5% to 50% by weight of the interpolymer latex. In a preferred formulation, the at least one vinyl aromatic monomer having 8 to 12 carbon atoms comprises greater than 70% by weight of the interpolymer latex.

The copolymerizable functional monomer may comprise from about 1% to 10% by weight of the interpolymer latex or from about 1% to 3% by weight of the interpolymer latex and is selected from the group consisting of acrylic acid and methacrylic acid. The cement composition may further include itaconic acid in an amount from about 0.5% to 3.5% by weight of the interpolymer latex.

The copolymerizable functional monomer may comprise from about 1% to 15% by weight of the interpolymer latex and include an activatable methyl, ethyl, propyl or butyl ester group, and a vinyl group. The cement composition may further include itaconic acid in an amount from about 0.5% to 3.5% by weight of the interpolymer latex.

The copolymerizable functional monomer may be a copolymerizable amido sulfonic acid monomer in an amount from about 1% to 50% by weight of the interpolymer latex, wherein the copolymerizable amido sulfonic acid monomer is 2-acrylamido-2 methylpropane-1-sulfonic acid. The cement composition may further include itaconic acid in an amount from about 0.5% to 3.5% by weight of the interpolymer latex. The cement composition may still further comprise at least one functional monomer in an amount from about 1% to 15% by weight of the interpolymer latex, with at least one functional monomer having an activatable methyl, ethyl, propyl or butyl ester group, and a vinyl group.

The copolymerizable functional monomer may be selected from the group consisting of methyl acrylamidoglycolate; ethyl acrylamidoglycolate; butyl acrylamidoglycolate; methyl acrylamidoglycolate methyl ether; butyl acrylamidoglycolate butyl ether; methyl methacryloxyacetate; ethyl acrylamido-N-oxalate; N-N'-bis(ethyloxalyl) acrylamide; N-isopropyl, N-ethyloxalyl-N'-methyleneaminoacrylamide; ethyl N-2-ethyloxamatoacrylate; ethyl 3 pyruvylacrylate; ethyl methylene pyruvate; methyl acrylthiocarbonyloxyacetate; methyl thiacrylthioglycolate; methy acryl-2-thioglycolate; methyl thiacrylamidoacetate; methyl acrylamidoglycolate thioether; methyl acrylamido-N-methylenetioglycolate; and para-ethyl oxalyl styrene.

The at least one conjugated diene monomer having 4 to 8 carbon atoms may be selected from a group consisting of 1,3 butadiene, piperylene, isoprene and 2,3 dimethyl-1,3 butadiene, and the at least one vinyl aromatic monomer having 8 to 12 carbon atoms may be selected from a group consisting of styrene, alpha methyl styrene, para tertiary butyl styrene, methyl vinyl toluene, para vinyl toluene and 3 ethyl styrene.

The cement composition may further comprise a dispersant in an amount from about 0.1% to 1.5% by weight of cement, a set retarder in an amount from about 0.1% to 5% by weight of cement, a silica material in an amount from about 20% to 50% by weight of cement, and an inorganic salt in an amount from about 10% to 40% by weight of water. The inorganic salt may be selected from the group consisting of sodium chloride in an amount from about 1% to 40% by weight of water, potassium chloride in an amount from about 1% to 10% by weight of water, and calcium chloride in an amount from about 1% to 4% by weight of cement.

A method of making a cement composition involves placing the above ingredients in a suitable mixer well known to those of ordinary skill in the art and mixing the ingredients until they form the cement composition. A method for cementing a subterranean zone penetrated by a wellbore involves forming a cement composition according to the above method, pumping the cement composition into the subterranean zone to be cemented by way of the wellbore, and allowing the cement composition to set within the subterranean zone.

It is, therefore, an object of the present invention to provide cement compositions for use in downhole cementing applications and methods of making therefor that employ an SB latex and that are effective at elevated temperatures.

It is another object of the present invention to provide cement compositions containing an SB latex that do not require stabilizers.

It is a further object of the present invention to provide cement compositions containing an SB latex that are effective at preventing gas migration or channeling.

Still further objects, features, and advantages of the present invention will become evident to those of ordinary skill in the art in light of the following.

DETAILED DESCRIPTION OF THE PREFEREED EMBODIMENT

A cement composition or slurry for forming a cement seal, either in a downhole pipe or in an annulus between a wellbore and a downhole pipe, such as a well casing, includes a hydraulic cement, silica, water, an SB latex, a set retardant, and, optionally, additives such as accelerators, dispersants, etc. The compositions according to the preferred embodiment comprise three essential ingredients: cement, 10 to 50% (by weight of cement) latex, and 30 to 200% (by weight of cement) water. In addition other materials may be used that are normal to the design of a cementing slurry. Some of these are 0.1 to 1.5% by weight of a dispersant to lower the mixing viscosity and 0.1 to 3.0% set retarders to allow pumping to the downhole temperature and pressure.

While various hydraulic cements can be utilized in forming the cement slurries or compositions of the preferred embodiment, Portland cement is preferred and can be, for example, one or more of the various types identified as API Classes A–H and J cements. These cements are identified and defined in "Specification for Cements and Materials for Well Cementing," API Specs 10A, 22nd ED., Jan. 1, 1995, American Petroleum Institute, which is incorporated herein for reference for all purposes. API Portland cements generally have a average particle size of 20 to 30 microns and a specific surface (sometimes referred to as Blaine Fineness) between 2200 and 3500 sqcm/gm. A highly useful and effective cement for the cement slurry includes API Class H Portland cement mixed with water or other additives to provide a slurry having a density of from about 11.3 to about 18.0 lbs./gal. In certain cases, small particle size hydraulic cements consisting of particles having diameters no larger than about 30 microns with the average about 5 microns and a Blaine Fineness of no less than about 6000 $cm^2$/gm may be employed. The water used in the cement slurries or compositions may be water from any source, provided that it does not contain an excess of compounds that adversely react with or otherwise affect other components in the cement slurry, such as calcium and sodium salts as well as other metals or organics. The water is present in an amount sufficient to form a slurry of the cement, preferably a slurry that is readily pumpable. Generally, the water is present in an amount of from about 30% to about 200% by weight of dry cement in the composition.

The cement compositions or slurries also contain a silica material, such as silica flour, in an amount of from about 20% to 50%, preferably 30% to 40%, by weight of dry cement when bottom hole static temperatures (BHSTs) are greater than 230° F.

The SB latex is one that contains from about 80% to about 95% by weight styrene and from about 5% to about 20% by weight butadiene based on the weight of the polymer. As is understood, SB latexes are emulsions of SB polymers in water. Gencorp, Inc. 165 Soouth Cleveland Avenue Mogadore, Ohio sell a particularly desirable SB latex for use in the cement composition of the preferred embodiment as Gen Ceal 8100™. And contains about 90% by weight styrene and 10% by weight butadiene based on the SB polymer weight. As is well known, this latex is sold as an emulsion containing approximately 45% by weight solids (SB polymer), has a specific gravity of 1.05, a pH of 7.5–9.5, and a Brookfield viscosity of 20. This desired SB latex can be made to include small amounts of copolymerizable monomers. By using the SB latexes containing high styrene-butadiene ratios (i.e., wherein the styrene content is 80% by weight or greater) preferably 85% by weight or greater, it is possible to formulate cement slurries that are stable at temperatures up to 380° F. without utilizing SB latex stabilizers.

Although the above SB latex is preferred, the following SB latexes may be used to formulate suitable cement compositions. An interpolymer latex comprised of:

(a) a mixture of 5 to 95% by weight of at least one conjugated diene monomer having 4 to 8 carbon atoms and from about 5 to 95% by weight of at least one vinyl aromatic monomer having 8 to 12 carbon atoms;
(b) a mixture according to (a) preferably containing a styrene content greater than 70% by weight of the copolymer latex;
(c) a mixture according to (a) containing additionally from about 1 to 10% by weight of at least on copolymerizable monomer selected from the group consisting of acrylic acid and methacrylic acid;
(d) a mixture according to (a) containing additionally from about 1 to 3% by weight of at least on copolymerizable monomer selected from the group consisting of acrylic acid and methacrylic acid;
(e) a mixture according to (a) containing additionally from about 0.5 to 3.5% by weight of itaconic acid;
(f) a mixture according to (a) containing additionally from about 1 to 15% by weight of at least one functional monomer having an activatable methyl, ethyl, propyl or butyl ester group and a vinyl group;
(g) a mixture according to (a) containing additionally from about 1 to 15% by weight of at least one functional monomer having an activatable methyl, ethyl, propyl or butyl ester group and a vinyl group and from about 0.5 to 3.5% by weight of itaconic acid;
(h) a mixture according to (a) containing additionally from about 1 to 50% of a copolymerizable amido sulfonic acid monomer;
(i) a mixture according to (a) containing additionally from about 1 to 50% of a copolymerizable amido sulfonic acid monomer and from about 0.5 to 3.5% by weight of itaconic acid; and/or
a mixture according to (a) containing additionally from about 1 to 50% of a copolymerizable amido sulfonic acid monomer and from about 1 to 15% by weight of at least on functional monomer having an activatable methyl, ethyl, propyl or butyl ester group and a vinyl group.

The conjugated diene monomer may be selected from a group consisting of 1,3 butadiene, piperylene, isoprene and 2,3 dimethyl-1,3 butadiene. The vinyl aromatic monomer may be selected from a group consisting of styrene, alpha methyl styrene, para tertiary butyl styrene, methyl vinyl toluene, para vinyl toluene and 3 ethyl styrene.

The functional monomer may be from the group consisting of:

Methyl acrylamidoglycolate,
Ethyl acrylamidoglycolate,
Butyl acrylamidoglycolate,
Methyl acrylamidoglycolate methyl ether,
Butyl acrylamidoglycolate butyl ether,
Methyl methacryloxyacetate,
Ethyl acrylamido-N-oxalate
N-N'-bis(ethyloxalyl)acrylamide
N-isopropyl, N-ethyloxalyl-N'-methyleneaminoacrylamide,
Ethyl N-2-ethyloxamatoacrylate,
Ethyl 3 pyruvylacrylate,
Ethyl methylene pyruvate,
Methyl acrylthiocarbonyloxyacetate,
Methyl thiacrylthioglycolate,
Methy acryl-2-thioglycolate,
Methyl thiacrylamidoacetate,
Methyl acrylamidoglycolate thioether,
Methyl acrylamido-N-methylenetioglycolate and
Para-ethyl oxalyl styrene.

The copolymerizable functional amido sulfonic acid monomer may be 2-acrylamido-2 methylpropane-1-sulfonic acid.

The functionalized interpolymer latexes overcome many of the limitations of styrene butadiene copolymer latexes described in the related art. Functionalized latexes have been used in construction industry applications for improved bonding but have not been used in well cementing applications because their reactivity makes them extremely unstable under conditions of cementing an oil or gas well. The improved performance of the latexes of the preferred embodiment results from the manufacturing process as well as the combined affect of the manufacturing process and functional co-monomers used in their preparation.

Latexes of the preferred embodiment are inherently stable in cements at elevated temperatures, in the presence of high electrolyte concentrations such as saturated sodium chloride brine as mix water, and in contact with high surface area clays such as bentonite, attapulgite, and sepiolite. Therefore, no additional or external stabilizer is required for cement compositions containing these latexes. This means high diene ratio latexes, those with a styrene concentration (or similar diene monomer described previously) greater than about 70% by weight of latex are more resistant to coagulation at elevated temperatures than lower styrene butadiene copolymer latexes.

The latexes of the preferred embodiment are effective film formers essentially independent of the diene monomer content, unlike styrene butadiene copolymer latexes. These latexes form stable, strong films at all temperatures above their glass transition temperature because of the presence of functional side chain groups. This film forming characteristic means even high styrene ratio latexes, those for example with a styrene (or a similar vinyl aromatic monomer as previously described) content greater than about 70% by weight of latex form stable films between cement grains of the slurry.

More importantly, the functionalized latexes of the preferred embodiment form composite materials with the cement by reaction of the functional side chains with mono- and (preferably) di- and tri-valent ions in the cement. The composite materials formed by this reaction are organometallic compounds or ionomers that have material properties different from the individual components from which they are formed. Additionally, functional side chains on the interpolymer latex are available to form chemical bonds with surrounding surfaces such as steel or fiberglass casings in a well and geologic formations of a borehole surface.

In addition to the hydraulic cement, the SB latex, water, and silica, depending on BHST, the cement compositions may also generally contain one or more retardants to prevent premature setting of the cement slurry. Those of ordinary skill in the art know numerous such set retardants. Non-limiting examples of set retardants or retarding agents are lignosulfonates, modified lignosulfonates, and various synthetic polymers. Non-limiting examples of cement set retarding additives that can be employed in cement compositions of the preferred embodiment include those disclosed in U.S. Pat. Nos. 5,355,955; 5,472,051; and 5,536,311, all of which are incorporated herein by reference for all purposes. The set retarding agents will be present in the cement compositions of the preferred embodiment in an amount of from about 0.1% to about 3% by weight based on the dry cement in the composition.

As noted, the cement slurries or compositions may, with advantage, contain other ingredients, such as dispersants that serve to disperse the cement and prevent harmful interactions between the latex and the cement when the temperature rises above about 50° C. Non-limiting examples of suitable dispersants are sulfonated aromatic-formaldehyde condensation products, such as disclosed in U.S. Pat. No. 3,954,677 incorporated herein by reference for all purposes. One such sulfonated aromatic-formaldehyde condensation product is available under the trademark "Lomar-D," well known to those in the industry.

The cement compositions may also incorporate an accelerator in the form of a water-soluble salt of an alkali or alkaline earth metal, preferably a halide of such a metal. Non-limiting examples of each accelerator include NaCl, KCl, $CaCl^2$, etc. Such accelerators may be incorporated at various levels depending upon the temperatures encountered in the well. Generally speaking, the accelerators (e.g., sodium chloride) will be present in an amount of from about 10% to about 18% by weight based on the weight of water in the cement slurry and, more particularly, from about 10% to about 15% by weight at BHSTs above 200° F.

The cement compositions including high-styrene-content SB latexes should not be employed with borates (borax, boric acid) or cellulose derivatives commonly used as fluid loss additives.

An improved method for cementing subterranean zone penetrated by a wellbore includes the steps of forming a pumpable, set retarded cement composition as described above; pumping the cement composition into the subterranean zone to be cemented by way of the wellbore; and allowing the cement composition to set therein. The method of forming the pumpable, set retarded cement composition as described above involves the mixing of the cement composition ingredients described in this preferred embodiment in a suitable mixer as would be well known to those of ordinary skill in the art.

As is well known, a cement composition used in downhole cementing operations should have a thickening time (as determined by API Specs 10A) of from about 3 to about 6 hours to ensure that the slurries remain pumpable for a sufficiently long time so as to be deposited at the desired location in the well before any substantial setting occurs. Another desirable feature of cement compositions is enhanced static gel strength, as that term and the method for determining it is defined in API Specs 10A noted above. Ideally and particularly when the prevention of gas migration is desired, the cement composition maintains a low static gel strength for a protracted period of time, followed by rapid gelation. Using the cement composition, such desired static gel strength results can be achieved.

The following are the preferred compositions:

At temperatures of less than 150 F. bentonite clay or other light weight materials with and increased water as needed to obtain density from 12.0 lb/gal to 16.5 lb/gal.
Latex of one gal per sack.
Set retarders or accelerators to adjust the desired thickening time at up to 0.2% and 2% respectively.
At temperature of 150 to 200 F.
Silica in the amount of 35%
High temperature set retarders in the amount of up to 0.3%
Latex in the amount of 2 gallons per sack
Dispersant in the amount of up to 0.5%
At temperature of 200 F. to 300 F.
Silica in the amount of 35%
High temperature set retarders in the amount of 1.5%
Latex in the amount of 2.0 gallons per sack
At temperatures of 300 F. to 380 F.
Silica in the amount of 35%
Latex in the amount of 2.0 gallons per sack High temperature set retarders in the amount of up to 2.2%
Dispersants used up to 0.5%

Reference is now made to Tables 1–4 below, which depicts testing done on various cement compositions, some of which are made in accordance with the preferred embodiment. All percentages are by weight unless otherwise included. Density is in pounds per gallon (ppg). Gallons per sack are equivalent to gal/94 lbs. of dry cement.

TABLE 1

Latex Summary

| # | cmt | ppg | % HR5 | % CaCl | % CFR-3 | % Lomar D | Latex gal/dk | psi | °F. | TT | Gen-Ceal |
|---|---|---|---|---|---|---|---|---|---|---|---|
| 1 | LW | 12.0 | 0.1 | | | | 1.0 | 2300 | 100 | 5:0+ | 8100 |
| 2 | H | 16.5 | | 2.0 | | | 1.0 | 2300 | 100 | 2:45 | 8100 |
| 3 | 35:65:8 | 12.0 | | 2.0 | | | 1.0 | Atm | 100 | 5:0+ | 8100 |
| 4 | H | 16.0 | | | 0.1 | | 1.0 | Atm | 100 | 4:30 | 8100 |
| 5 | LW | 12.0 | | | | 0.1 | 1.0 | 4900 | 150 | 5:10 | 8100 |
| 6 | H | 16.5 | 0.2 | | | | 1.0 | Atm | 150 | 0:19 | 8100 |
| 7 | H | 16.5 | 0.2 | | 0.1 | | 1.0 | Atm | 150 | 4.0+ | 8100 |
| 8 | H | 16.0 | 0.1 | | 0.1 | | 1.0 | Atm | 150 | 4:12 | 8100 |
| 9 | LW | 12.0 | | | 0.05 | | 1.0 | Atm | 150 | 5:0+ | 8100 |
| 10 | H | 16.5 | 0.2 | | | | 1.0 | 4900 | 150 | 0:32 | 8100 |
| 11 | H | 16.5 | 0.1 | | 0.1 | | 1.0 | 4900 | 150 | 6:0+ | 8100 |

TABLE 2

Latex Summary

| # | cmt | ppg | % SS A2 | % HR 12 | % CF R3 | % S8 | % R8 | % CD 33 | Latex gal/sk | psi | °F. | TT | Gen-Ceal |
|---|---|---|---|---|---|---|---|---|---|---|---|---|---|
| 12 | H | 17.12 | 35 | 0.2 | | | | | | 10,000 | 200 | 4:22 | |
| 13 | H | 17.12 | 35 | 0.2 | | | | | 2.0 | 10,000 | 200 | 0:23 | 8100 |
| 14 | H | 17.10 | 35 | 0.3 | 0.2 | | | | 2.0 | 10,000 | 200 | 3:03 | 8100 |
| 15 | H | 16.20 | | | | 35 | 0.3 | 0.5 | 2.0 | 10,000 | 200 | 4:14 | 8100 |
| 16 | H | 17.03 | 35 | 1.5 | | | | | | 10,000 | 300 | 3:22 | |
| 17 | H | 17.03 | 35 | 1.5 | | | | | 2.0 | 10,000 | 300 | 4:11 | 8100 |

TABLE 3

Latex Summary

| # | cmt | ppg | % SS A2 | % HR 12 | % CF R3 | % S8 | % R8 | % CD 33 | Latex gal/sk | psi | °F. | TT | Gen-Ceal |
|---|---|---|---|---|---|---|---|---|---|---|---|---|---|
| 18 | H | 16.99 | 35 | 2.0 | 0.2 | | | | 2.0 | 18,000 | 380 | 4:46 | |
| 19 | H | 16.99 | 35 | 2.0 | 0.2 | | | | 2.0 | 18,000 | 380 | 4:04 | 8100 |
| 20 | H | 16.20 | | | | 35 | 1.0 | 0.5 | 2.0 | 18,000 | 380 | 1:30 | 8100 |
| 21 | H | 16.20 | | | | 35 | 2.5 | 0.5 | 2.0 | 18,000 | 380 | 3.59 | 8100 |

TABLE 4

Latex Summary

| # | cmt | ppg | % 100 mesh | % C202 | % HR-15 | % CFR3 | % salt | Latex gal/sk | psi | °F. | TT | Gen-Ceal |
|---|---|---|---|---|---|---|---|---|---|---|---|---|
| 22 | H | 16.50 | 35 | 2.2 | | | | | 5,000 | 380 | 3:54 | |
| 23 | H | 16.50 | 35 | 2.2 | | | | 2.0 | 5,000 | 380 | 2:26 | 8125 |
| 24 | H | 16.50 | 35 | 2.2 | | 0.5 | | 2.0 | 5,000 | 380 | 2:23 | 8100 |
| 25 | H | 16.50 | 35 | 2.2 | | | | 2.0 | 5,000 | 380 | 4:13 | 8200 |
| 26 | H | 16.50 | 35 | 2.2 | 3.0 | | 18 | | 5,000 | 380 | 6:00 | 8200 |

Figure 1:
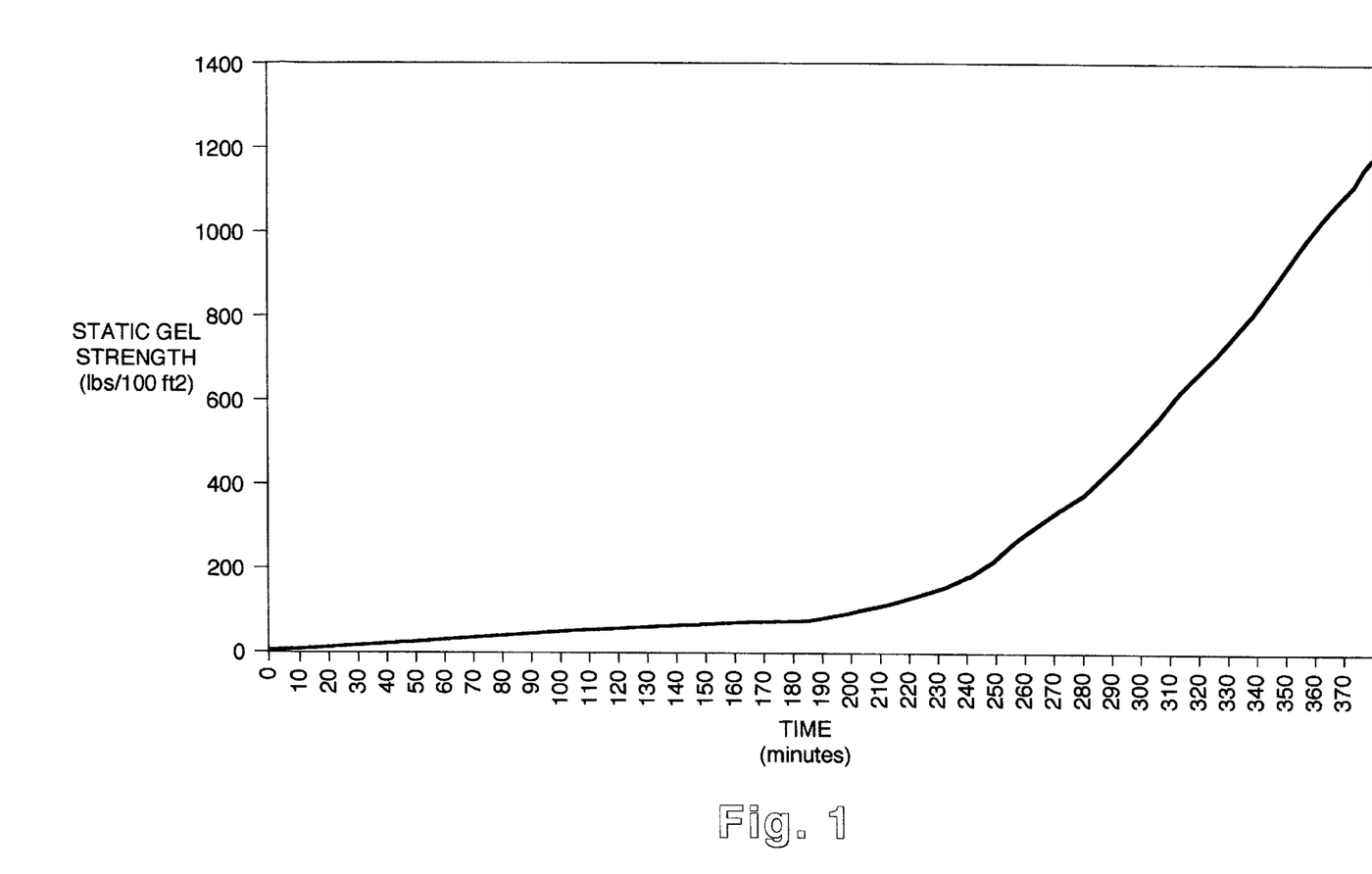
FIG. 1 is a static gel strength curve from slurry numbers 16 in Table 2. This slurry is the base cement slurry without latex at 300° F.
Figure 2:
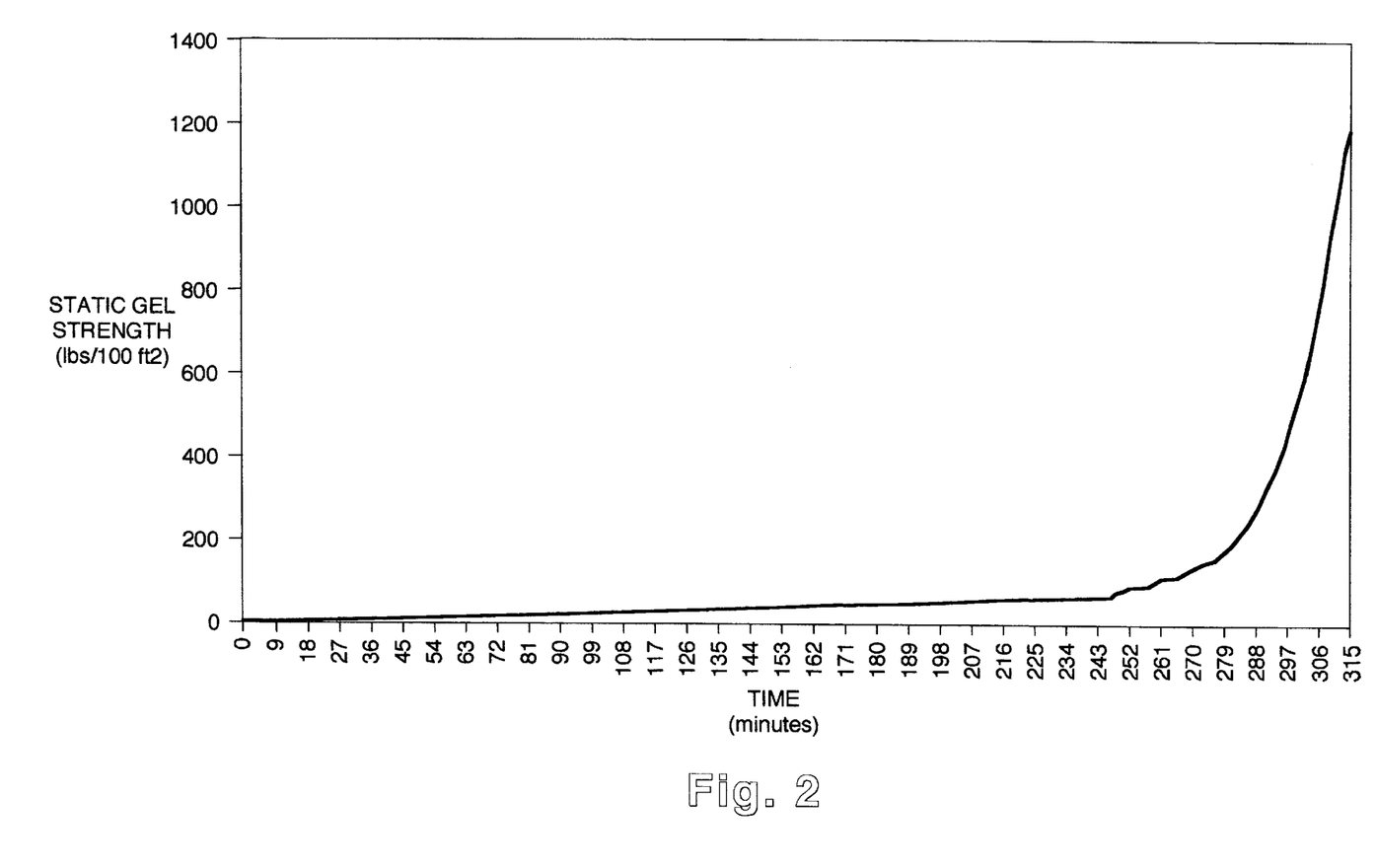
FIG. 2 is a static gel strength curve from slurry number 17 in Table 2. This slurry is the base cement slurry with added latex at 300° F.

As can be seen from comparing FIGS. 1 and 2, wherein FIG. 1 represents 300° F. Test No. 16 and FIG. 2 represents 300° F. Test No. 17 (see Table 3 above), using the cement composition of the preferred embodiment, markedly enhanced static gel strength is obtained using the high-styrene content SB latex. Slurry number 16 had a significantly longer transition time (time from 100 lbs/100 sqft to 500 lbs/100 sqft) than did the same cement slurry with similar pumping times except for the addition of the latex additive. Additionally, as can be seen from the data in Table 1–4, one can achieve cement compositions having desirable thickening times without the incorporation of any latex stabilizers other than conventional cementing additives routinely used in the cement slurry designs. In this regard cement slurries were designed from 100 (F. to 380 (F. at densities from 12.0 lbs/gal to 17.1 lbs/gal.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A cement composition, comprising:
    hydraulic cement;
    water in an amount from about 30% to 200% by weight of cement; and
    an interpolymer latex in an amount from about 10% to 50% by weight of cement, the interpolymer latex, comprising:
        at least one conjugated diene monomer having 4 to 8 carbon atoms in an amount from about 5% to 95% by weight of the interpolymer latex,
        at least one vinyl aromatic monomer having 8 to 12 carbon atoms in an amount from about 5% to 95% by weight of the interpolymer latex, and
        a copolymerizable functional monomer selected from the group consisting of acrylic acid and methacrylic acid in an amount from about 1% to 10% by weight of the interpolymer latex, an activatable methyl, ethyl, propyl or butyl ester group, and a vinyl group in an amount from about 1% to 15% by weight of the interpolymer latex, a copolymerizable amido sulfonic acid monomer in an amount from about 1% to 50% by weight of the interpolymer latex, and methyl acrylamidoglycolate, ethyl acrylamidoglycolate, butyl acrylamidoglycolate, methyl acrylamidoglycolate methyl ether, butyl acrylamidoglycolate butyl ether, methyl methacryloxyacetate, ethyl acrylamido-N-oxalate, N-N'-bis(ethyloxalyl) acrylamide, N-isopropyl-methyleneaminoacrylamide, N-ethyloxalyl-N'-methyleneaminoacrylamide, ethyl N-2-ethyloxamatoacrylate, ethyl 3 pyruvylacrylate, ethyl methylene pyruvate, methyl acrylthiocarbonyloxyacetate, methyl thiacrylthioglycolate, methy acryl-2-thioglycolate, methyl thiacrylamidoacetate, methyl acrylamidoglycolate thioether, methyl acrylamido-N-methylenetioglycolate, and para-ethyl oxalyl styrene in an amount from about 0.5% to 50% by weight of the interpolymer latex.

2. The cement composition according to claim 1, wherein the at least one vinyl aromatic monomer having 8 to 12 carbon atoms comprises greater than 70% by weight of the interpolymer latex.

3. The cement composition according to claim 1, further comprising itaconic acid in an amount from about 0.5% to 3.5% by weight of the interpolymer latex.

4. The cement composition according to claim 1, further comprising itaconic acid in an amount from about 0.5% to 3.5% by weight of the interpolymer latex.

5. The cement composition according to claim 1, wherein the copolymerizable amido sulfonic acid monomer is 2-acrylamido-2 methylpropane-1-sulfonic acid.

6. The cement composition according to claim 1, further comprising itaconic acid in an amount from about 0.5% to 3.5% by weight of the interpolymer latex.

7. The cement composition according to claim 1, further comprising at least one functional monomer in an amount from about 1% to 15% by weight of the interpolymer latex, with at least one functional monomer having an activatable methyl, ethyl, propyl or butyl ester group, and a vinyl group.

8. The cement composition according to claim 1, wherein the at least one conjugated diene monomer having 4 to 8 carbon atoms is selected from the group consisting of 1,3 butadiene, piperylene, isoprene and 2,3 dimethyl-1,3 butadiene.

9. The cement composition according to claim 1, wherein the at least one vinyl aromatic monomer having 8 to 12 carbon atoms is selected from the group consisting of styrene, alpha methyl styrene, para tertiary butyl styrene, methyl vinyl toluene, para vinyl toluene and 3 ethyl styrene.

10. The cement composition according to claim 1, wherein the hydraulic cement is Portland cement.

11. The cement composition according to claim 1, further comprising a dispersant in an amount from about 0.1% to 1.5% by weight of cement.

12. The cement composition according to claim 1, further comprising a set retarder in an amount from about 0.1% to 5% by weight of cement.

13. The cement composition according to claim 1, further comprising a silica material in an amount from about 20% to 50% by weight of cement.

14. The cement composition according to claim 1, further comprising an inorganic salt in an amount from about 10% to 40% by weight of water.

15. The cement composition according to claim 14, wherein the inorganic salt is selected from the group consisting of sodium chloride in an amount from about 1% to 40% by weight of water, potassium chloride in an amount from about 1% to 10% by weight of water, and calcium chloride in an amount from about 1% to 4% by weight of cement.

16. A method of making a cement composition, comprising the steps of:
    placing hydraulic cement into a mixer;
    adding water in an amount of from about 30% to 200% by weight of cement into the mixer;
    adding an interpolymer latex in an amount from about 10% to 50% by weight of cement into the mixer, the interpolymer latex, comprising:
        at least one conjugated diene monomer having 4 to 8 carbon atoms in an amount of from about 5% to 95% by weight of the interpolymer latex,
        at least one vinyl aromatic monomer having 8 to 12 carbon atoms in an amount of from about 5% to 95% by weight of the interpolymer latex, and
        a copolymerizable functional monomer selected from the group consisting of acrylic acid and methacrylic acid in an amount from about 1% to 10% by weight of the interpolymer latex, an activatable methyl, ethyl, propyl or butyl ester group, and a vinyl group in an amount from about 1% to 15% by weight of the interpolymer latex, a copolymerizable amido sulfonic acid monomer in an amount from about 1% to 50% by weight of the interpolymer latex, and methyl acrylamidoglycolate, ethyl acrylamidoglycolate, butyl acrylamidoglycolate, methyl acrylamidoglycolate methyl ether, butyl acrylamidoglycolate butyl ether, methyl methacryloxyacetate, ethyl acrylamido-N-oxalate, N-N'-bis(ethyloxalyl) acrylamide, N-isopropyl-methyleneaminoacrylamide, N-ethyloxalyl-N'-methyleneaminoacrylamide, ethyl N-2-ethyloxamatoacrylate, ethyl 3 pyruvylacrylate, ethyl methylene pyruvate, methyl acrylthiocarbonyloxyacetate, methyl thiacrylthioglycolate, methy acryl-2-thioglycolate, methyl thiacrylamidoacetate, methyl acrylamidoglycolate thioether, methyl acrylamido-N-methylenetioglycolate, and para-ethyl oxalyl styrene in an amount from about 0.5% to 50% by weight of the interpolymer latex; and mixing the cement, water, and interpolymer latex until the cement, water, and interpolymer latex combine to form the cement composition.

17. The method of making a cement composition according to claim 16, wherein, in the step of adding an interpolymer latex, the at least one vinyl aromatic monomer having 8 to 12 carbon atoms comprises greater than 70% by weight of the interpolymer latex.

18. The method of making a cement composition according to claim 16, wherein, in the step of adding an interpolymer latex, the interpolymer latex further comprises itaconic acid in an amount from about 0.5% to 3.5% by weight of the interpolymer latex.

19. The method of making a cement composition according to claim 16, wherein, in the step of adding an interpolymer latex, the interpolymer latex further comprises itaconic acid in an amount from about 0.5% to 3.5% by weight of the interpolymer latex.

20. The method of making a cement composition according to claim 16, wherein, in the step of adding an interpolymer latex, the copolymerizable amido sulfonic acid monomer is 2-acrylamido-2 methylpropane-1-sulfonic acid.

21. The method of making a cement composition according to claim 16, wherein, in the step of adding an interpolymer latex, the interpolymer latex further comprises itaconic acid in an amount from about 0.5% to 3.5% by weight of the interpolymer latex.

22. The method of making a cement composition according to claim 16, wherein, in the step of adding an interpolymer latex, the interpolymer latex further comprises at least one functional monomer in an amount from about 1% to 15% by weight of the interpolymer latex, with at least one functional monomer having an activatable methyl, ethyl, propyl or butyl ester group, and a vinyl group.

23. The method of making a cement composition according to claim 16, wherein, in the step of adding an interpolymer latex, the at least one conjugated diene monomer having 4 to 8 carbon atoms is selected from the group consisting of 1,3 butadiene, piperylene, isoprene and 2,3 dimethyl-1,3 butadiene.

24. The method of making a cement composition according to claim 16, wherein, in the step of adding an interpolymer latex, the at least one vinyl aromatic monomer having 8 to 12 carbon atoms is selected from the group consisting of styrene, alpha methyl styrene, para tertiary butyl styrene, methyl vinyl toluene, para vinyl toluene and 3 ethyl styrene.

25. The method of making a cement composition according to claim 16, wherein, in the step of placing cement into a mixer, the hydraulic cement is Portland cement.

26. The method of making a cement composition according to claim 16, further comprising the step of adding a dispersant in an amount from about 0.1% to 1.5% by weight of cement into the mixer.

27. The method of making a cement composition according to claim 16, further comprising the step of adding a set retarder in an amount from about 0.1% to 5% by weight of cement into the mixer.

28. The method of making a cement composition according to claim 16, further comprising the step of adding a silica material in an amount from about 20% to 50% by weight of cement into the mixer.

29. The method of making a cement composition according to claim 16, further comprising the step of adding an inorganic salt in an amount from about 10% to 40% by weight of water into the mixer.

30. The method of making a cement composition according to claim 29, wherein, in the step of adding an inorganic salt, the inorganic salt is selected from the group consisting of sodium chloride in an amount from about 1% to 40% by weight of water, potassium chloride in an amount from about 1% to 10% by weight of water, and calcium chloride in an amount from about 1% to 4% by weight of cement.

31. A method for cementing a subterranean zone penetrated by a wellbore, comprising the steps of:
    forming a cement composition, comprising: hydraulic cement, water in an amount from about 30% to 200% by weight of cement, and an interpolymer latex in an amount from about 10% to 50% by weight of cement, the interpolymer latex, comprising:
      at least one conjugated diene monomer having 4 to 8 carbon atoms in an amount from about 5% to 95% by weight of the interpolymer latex,
      at least one vinyl aromatic monomer having 8 to 12 carbon atoms in an amount from about 5% to 95% by weight of the interpolymer latex, and
      a copolymerizable functional monomer selected from the group consisting of acrylic acid and methacrylic acid in an amount from about 1% to 10% by weight of the interpolymer latex, an activatable methyl, ethyl, propyl or butyl ester group, and a vinyl group in an amount from about 1% to 15% by weight of the interpolymer latex, a copolymerizable amido sulfonic acid monomer in an amount from about 1% to 50% by weight of the interpolymer latex, and methyl acrylamidoglycolate, ethyl acrylamidoglycolate, butyl acrylamidoglycolate, methyl acrylamidoglycolate methyl ether, butyl acrylamidoglycolate butyl ether, methyl methacryloxyacetate, ethyl acrylamido-N-oxalate N-N'-bis(ethyloxalyl) acrylamide N-isopropyl-methyleneaminoacrylamide, N-ethyloxalyl-N'-methyleneaminoacrylamide, ethyl N-2-ethyloxamatoacrylate, ethyl 3 pyruvylacrylate, ethyl methylene pyruvate, methyl acrylthiocarbonyloxyacetate, methyl thiacrylthioglycolate, methy acryl-2-thioglycolate, methyl thiacrylamidoacetate, methyl acrylamidoglycolate thioether, methyl acrylamido-N-methylenetioglycolate, and para-ethyl oxalyl styrene in an amount from about 0.5% to 50% by weight of the interpolymer latex; pumping the cement composition into the subterranean zone to be cemented by way of the wellbore; and
    allowing the cement composition to set within the subterranean zone.

32. The method of cementing a subterranean zone penetrated by a wellbore according to claim 31, wherein, in the step of forming the cement composition, the at least one vinyl aromatic monomer having 8 to 12 carbon atoms comprises greater than 70% by weight of the interpolymer latex.

33. The method of cementing a subterranean zone penetrated by a wellbore according to claim 31, wherein, in the step of forming the cement composition, the interpolymer latex further comprises itaconic acid in an amount from about 0.5% to 3.5% by weight of the interpolymer latex.

34. The method of cementing a subterranean zone penetrated by a wellbore according to claim 31, wherein, in the step of forming the cement composition, the interpolymer latex further comprises itaconic acid in an amount from about 0.5% to 3.5% by weight of the interpolymer latex.

35. The method of cementing a subterranean zone penetrated by a wellbore according to claim 31, wherein, in the step of forming the cement composition, the copolymerizable amido sulfonic acid monomer is 2-acrylamido-2 methylpropane-1-sulfonic acid.

36. The method of cementing a subterranean zone penetrated by a wellbore according to claim 31, wherein, in the step of forming the cement composition, the interpolymer latex further comprises itaconic acid in an amount from about 0.5% to 3.5% by weight of the interpolymer latex.

37. The method of cementing a subterranean zone penetrated by a wellbore according to claim 31, wherein, in the step of forming the cement composition, the interpolymer latex comprises at least one functional monomer in an amount from about 1% to 15% by weight of the interpolymer latex, with at least one functional monomer having an activatable methyl, ethyl, propyl or butyl ester group, and a vinyl group.

38. The method of cementing a subterranean zone penetrated by a wellbore according to claim 31, wherein, in the step of forming the cement composition, the at least one conjugated diene monomer having 4 to 8 carbon atoms is selected from the group consisting of 1,3 butadiene, piperylene, isoprene and 2,3 dimethyl-1,3 butadiene.

39. The method of cementing a subterranean zone penetrated by a wellbore according to claim 31, wherein, in the step of forming the cement composition, the at least one vinyl aromatic monomer having 8 to 12 carbon atoms is selected from the group consisting of styrene, alpha methyl styrene, para tertiary butyl styrene, methyl vinyl toluene, para vinyl toluene and 3 ethyl styrene.

40. The method of cementing a subterranean zone penetrated by a wellbore according to claim 31, wherein, in the step of forming the cement composition, the hydraulic cement is Portland cement.

41. The method of cementing a subterranean zone penetrated by a wellbore according to claim 31, wherein the step of forming the cement composition further comprises the step of adding a dispersant in an amount from about 0.1% to 1.5% by weight of cement.

42. The method of cementing a subterranean zone penetrated by a wellbore according to claim 31, wherein the step of forming the cement composition further comprises the step of adding a set retarder in an amount from about 0.1% to 5% by weight of cement.

43. The method of cementing a subterranean zone penetrated by a wellbore according to claim 31, wherein the step of forming the cement composition further comprises the step of adding a silica material in an amount from about 20% to 50% by weight of cement.

44. The method of cementing a subterranean zone penetrated by a wellbore according to claim 31, wherein the step of forming the cement composition further comprises the step of adding an inorganic salt in an amount from about 10% to 40% by weight of water.

45. The method of cementing a subterranean zone penetrated by a wellbore according to claim 44, wherein, in the step of adding an inorganic salt, the inorganic salt is selected from the group consisting of sodium chloride in an amount from about 1% to 40% by weight of water, potassium chloride in an amount from about 1% to 10% by weight of water, and calcium in an amount from about 1% to 4% by weight of cement.

* * * * *